US008106786B2

(12) United States Patent
Kim et al.

(10) Patent No.: US 8,106,786 B2
(45) Date of Patent: Jan. 31, 2012

(54) TERMINAL INCLUDING LIGHT EMITTING DEVICE, METHOD OF NOTIFYING SELECTION OF ITEM USING THE TERMINAL, AND METHOD OF NOTIFYING OCCURRENCE OF EVENT USING THE TERMINAL

(75) Inventors: Huhn Kim, Seoul (KR); Young Suk Oh, Daejeon-si (KR); Hyun Ho Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 236 days.

(21) Appl. No.: 11/738,640

(22) Filed: Apr. 23, 2007

(65) Prior Publication Data
US 2008/0036575 A1    Feb. 14, 2008

(30) Foreign Application Priority Data
Aug. 9, 2006    (KR) .................. 10-2006-0075287

(51) Int. Cl.
*G08B 21/00*    (2006.01)

(52) U.S. Cl. ........... 340/641; 313/510; 345/173; 341/20

(58) Field of Classification Search .................. 340/641, 340/815.53, 815.4; 313/510; 345/173; 341/20, 341/21
See application file for complete search history.

(56) References Cited

U.S. PATENT DOCUMENTS

| | | | |
|---|---|---|---|
| 4,748,756 A * | 6/1988 | Ross ................................ 40/715 |
| 5,711,160 A * | 1/1998 | Namisniak et al. ............. 62/125 |
| 6,010,339 A * | 1/2000 | McDonald ..................... 434/258 |
| 6,046,550 A * | 4/2000 | Ference et al. ................. 315/291 |
| 6,647,774 B1 * | 11/2003 | Youngquist ................. 73/170.02 |
| 6,940,493 B2 * | 9/2005 | Blumberg et al. ............. 345/173 |
| 7,362,221 B2 * | 4/2008 | Katz ........................ 340/539.11 |
| 7,366,921 B2 * | 4/2008 | Ranganathan ................ 713/300 |
| 2002/0191029 A1 * | 12/2002 | Gillespie et al. .............. 345/810 |
| 2004/0198455 A1 | 10/2004 | Deeds |
| 2004/0203490 A1 | 10/2004 | Kaplan |
| 2007/0026932 A1 * | 2/2007 | Sato ................................ 463/20 |
| 2007/0285402 A1 * | 12/2007 | Lim et al. ...................... 345/173 |
| 2010/0188268 A1 * | 7/2010 | Grignani et al. ................ 341/22 |

FOREIGN PATENT DOCUMENTS

| | | |
|---|---|---|
| EP | 0 872 996 A | 10/1998 |
| EP | 1 821 177 A | 8/2007 |
| JP | 2004012590 | 1/2004 |
| JP | 2005352461 | 12/2005 |

* cited by examiner

Primary Examiner — George Bugg
Assistant Examiner — Edny Labbees
(74) Attorney, Agent, or Firm — Lee, Hong, Degerman, Kang & Waimey (57) ABSTRACT

Disclosed herein is a method of notifying the selection of an item using a plurality of light emitting devices provided in a terminal, including: selecting an item of at least one item displayed on a display included in the terminal, and notifying the selection of the item using the plurality of light emitting devices. Disclosed herein is also a method of notifying the occurrence of an event using a plurality of light emitting devices provided in a terminal, including: notifying the occurrence of the event using the light emitting devices according to the detection of the occurrence of the event.

9 Claims, 12 Drawing Sheets

TERMINAL INCLUDING LIGHT EMITTING DEVICE, METHOD OF NOTIFYING SELECTION OF ITEM USING THE TERMINAL, AND METHOD OF NOTIFYING OCCURRENCE OF EVENT USING THE TERMINAL

This application claims the priority benefit of Korean Patent Application No. 10-2006-0075287, filed on Aug. 9, 2006, which is hereby incorporated by reference as if fully set forth herein.

BACKGROUND OF THE INVENTION

1. Field of the Invention

The present invention relates to a terminal, and more particularly, to a terminal which is capable of providing new interest and convenience to a user by notifying the user of the selection of an item or the occurrence of an event relating to a function provided by the terminal, using a light emitting device provided therein, a method of notifying the selection of an item using the terminal, and a method of notifying the occurrence of an event using the terminal.

2. Discussion of the Related Art

Generally, when any item set in a terminal is selected by a user, the terminal positions a cursor on the selected item or outputs a sound corresponding to the selected item to notify the user of the selection of the item. However, such a simple notifying function cannot satisfy the desire of a user who pursues a variety of interests through a terminal.

Thus, when an event such as the movement between menu items included in a menu, the transmission/reception of a message and the transmission/reception of a call occurs, a terminal displays information related to the occurred event on a screen or outputs a sound to notify a user of the occurrence of the event. However, a function for notifying the user of the occurrence of an event cannot satisfy a variety of desires of the user.

SUMMARY OF THE INVENTION

Accordingly, the present invention is directed to a terminal including a light emitting device, a method of notifying the selection of an item using the terminal, and a method of notifying the occurrence of an event using the terminal that substantially obviate one or more problems due to limitations and disadvantages of the related art.

An object of the present invention is to provide a terminal which is capable of notifying a user of the selection of an item using a light emitting device provided therein and a method of notifying the selection of the item using the terminal.

Another object of the present invention is to provide a terminal which is capable of notifying a user of the occurrence of an event relating to a function provided by the terminal using a light emitting device provided therein and a method of notifying the occurrence of the event using the terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of notifying the selection of an item using a plurality of light emitting devices provided in a terminal, includes: displaying at least one item on a display unit included in the terminal; selecting an item of the displayed at least one item; and notifying the selection of the item using a light emitting device indicating the selected item among the plurality of light emitting devices. Here, the light emitting devices are provided outside the display unit.

In another aspect of the present invention, a method of notifying the occurrence of an event using a plurality of light emitting devices provided in a terminal, includes: detecting the occurrence of the event; and notifying the occurrence of the event using a light emitting device allocated to the occurred event among the plurality of light emitting devices according to the detection of the occurrence of the event. Here, the light emitting devices are provided outside a display unit included in the terminal.

In another aspect of the present invention, a terminal including a light emitting device includes: a display unit configured to display at least one item; an input unit configured to receive a selection signal of an item among the displayed at least one item; a plurality of light emitting devices provided outside the display unit; and a control unit configured to control the operation of a light emitting device indicating the selected item among the plurality of light emitting devices in order to notify the selection of the item according to the selection signal.

In another aspect of the present invention, a terminal including a light emitting device includes; a display unit; a plurality of light emitting devices provided outside the display unit; and a control unit configured to control the operation of a light emitting device allocated to an occurred event among the plurality of light emitting devices in order to notify the occurrence of the event, according to the detection of the occurrence of the event.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. If it is determined that the detailed description of a related known function or construction renders the scope of the present invention unnecessarily ambiguous, the detailed description thereof will be omitted.

Figure 1:
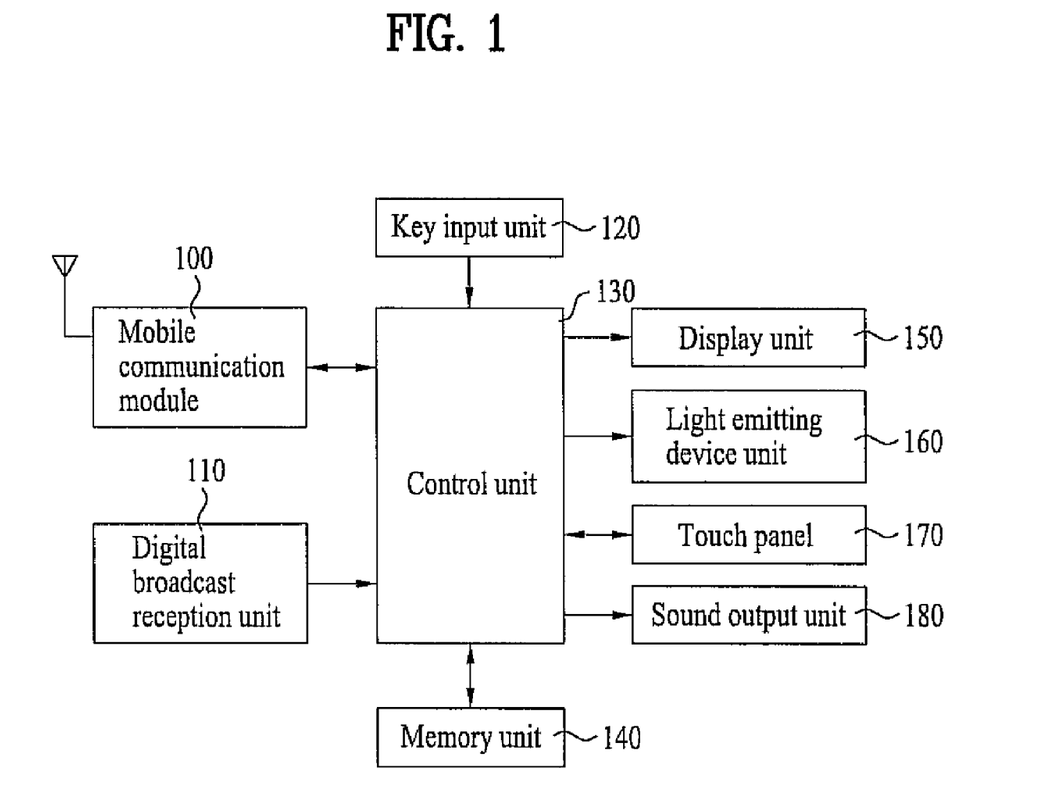
FIG. 1 is a block diagram showing a terminal according to an embodiment of the present invention.
Figure 2:
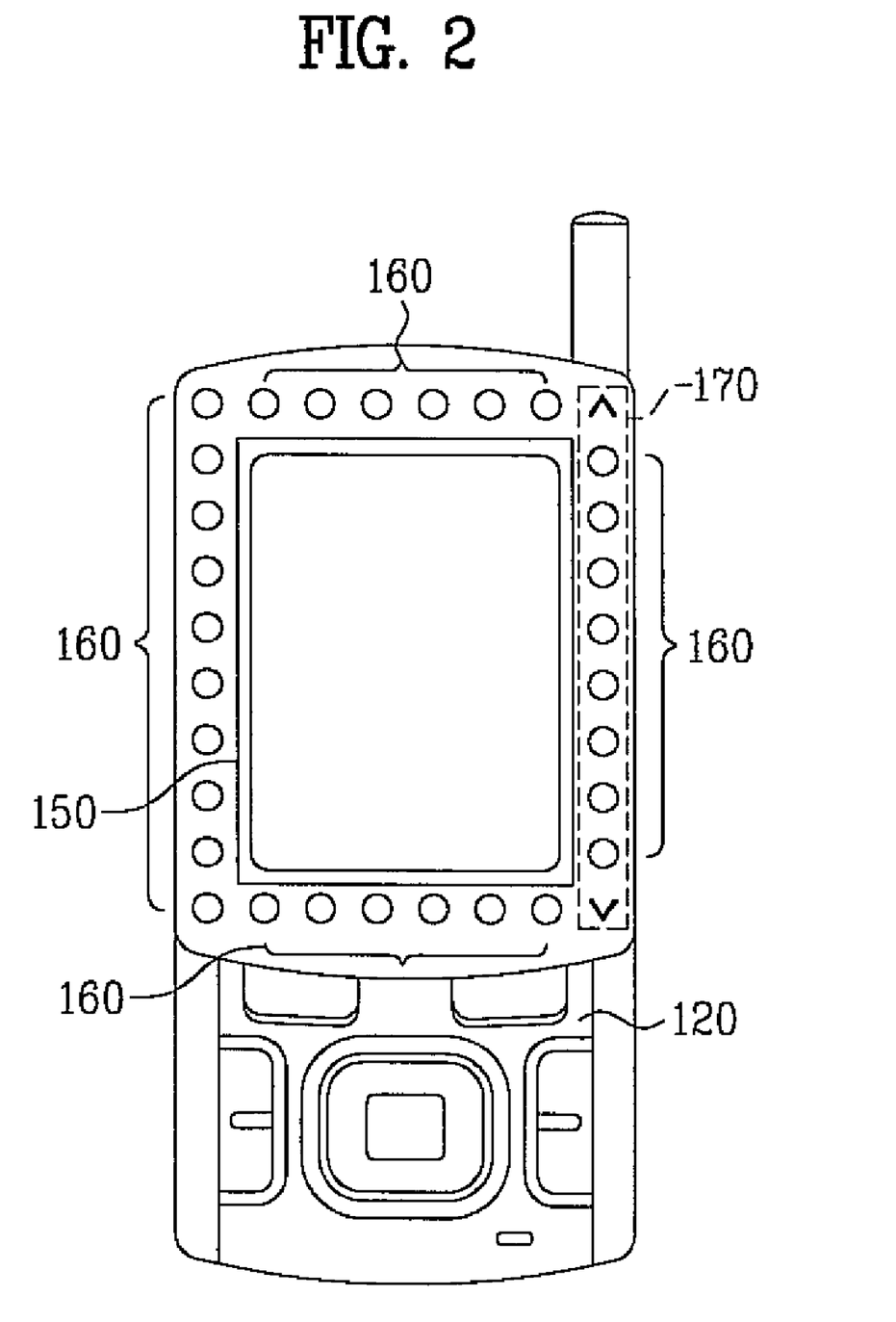
FIG. 2 is a front view showing the terminal according to an embodiment of the present invention.

FIG. 1 is a block diagram showing a terminal according to an embodiment of the present invention. FIG. 2 is a front view showing the terminal according to an embodiment of the present invention. The terminal according to the present invention will be described in detail with reference to FIGS. 1 and 2.

The terminal includes a mobile communication module 100, a digital broadcast reception unit 110, a key input unit 120, a control unit 130, a memory unit 140, a display unit 150, a light emitting device unit 160, a touch panel 170 and a sound output unit 180.

The mobile communication module 100 is a communication device for transmitting/receiving data over a mobile communication network. The digital broadcast reception unit 110 is a communication device for receiving a digital broadcast signal from a broadcasting center. The key input unit 120 is an input device which includes a variety of numerical keys or directional keys and receives a variety of information or commands from a user. The control unit 130 controls the whole operation of the terminal according to an embodiment of the present invention. The memory unit 140 stores a predetermined program for controlling the whole operation of the terminal according to an embodiment of the present invention and a variety of data inputted/outputted or processed when the operation of the terminal is performed by the control unit 130. The display unit 150 is a display device for displaying the state of the terminal or a variety of information.

The light emitting device unit 160 includes a plurality of light emitting devices. The light emitting device may be, for example, a light emitting diode. The light emitting device unit 160 is provided outside the display unit 150, as shown in FIG. 2. The touch panel 170 is an input device for recognizing touch (or contact) as an input signal. The touch panel 170 is preferably provided at the same position as the light emitting device unit 160, as shown in FIG. 2. The touch panel 170 may be implemented by a resistive method, an optical method, a capacitive method, an ultrasonic method or a pressing method. The sound output unit 180 is a sound output device for outputting a sound, such as a speaker.

Figure 3:
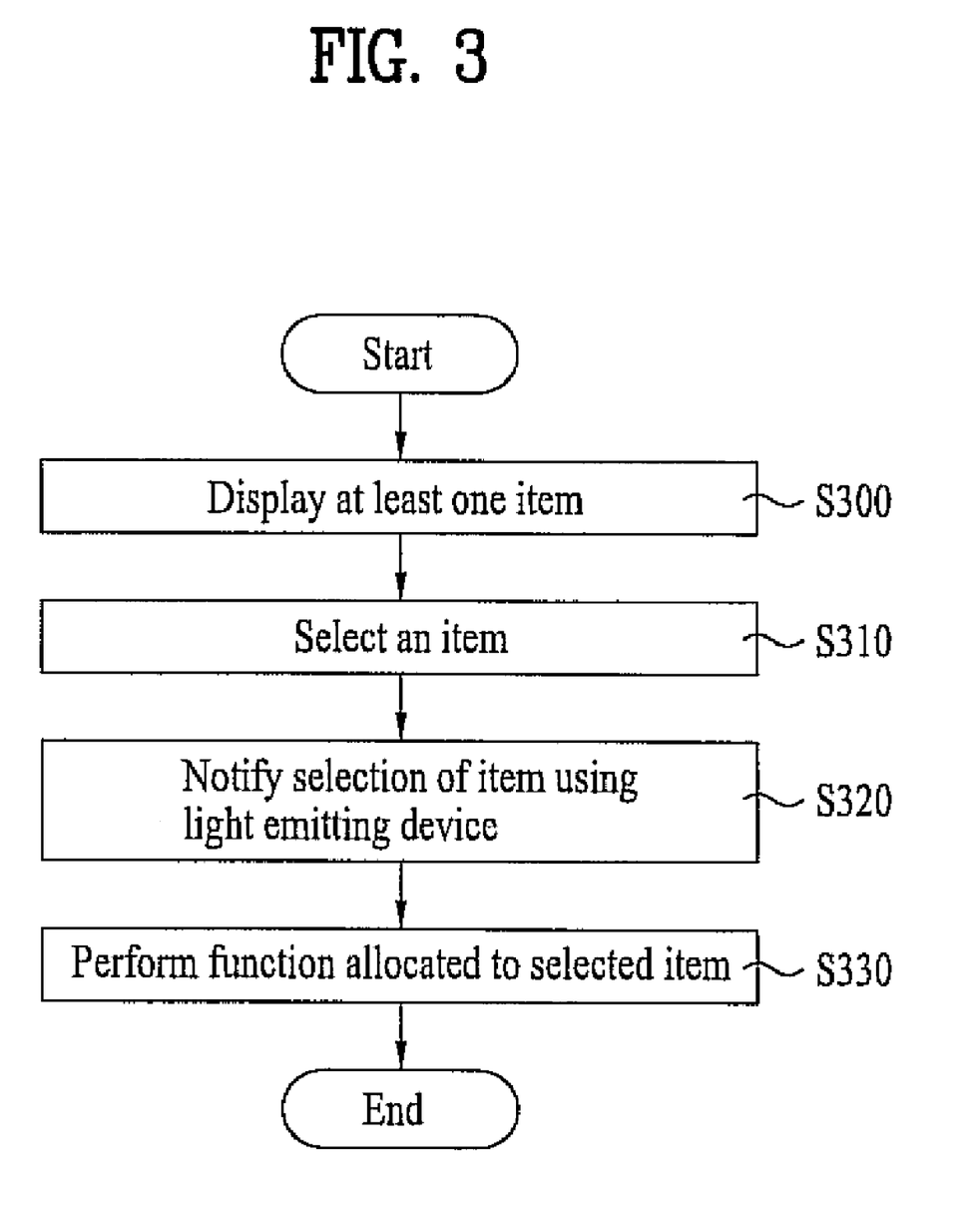
FIG. 3 is a flowchart illustrating a method of notifying the selection of an item using a light emitting device in the terminal according to an embodiment of the present invention.

Hereinafter, a method of notifying the selection of an item using the terminal according to an embodiment of the present invention shown in FIGS. 1 and 2 will be described in detail, concentrating on the operation of the control unit 130. FIG. 3 is a flowchart illustrating a method of notifying the selection of an item using the light emitting device in the terminal according to an embodiment of the present invention.

First, the terminal displays at least one item on the display unit 150 (S300). The step S300 is implemented by allowing the control unit 130 to output a control signal for displaying at least one item on the display unit 150. In the step S300, the terminal displays at least one item on the display unit 150 by touching any point of the touch panel 170. The item includes a menu, a file, a message by a short message service (SMS), a message by a multimedia messaging system (MMS), or all objects which can be arranged in a list form. The form of the items displayed on the display unit 150 may be various. For example, the items may be displayed in the form of at least one of a text, an icon and an image.

The terminal selects an item among the displayed at least one item (S310). The step S310 may be implemented using a variety of methods. First, an item can be selected using directional keys or a shortcut key included in the key input unit 120. Second, if the display unit 150 is a touch screen, an item may be selected using the touch screen. Third, an item may be selected using the touch panel 170. Preferably, an item is selected by touching a point arranged parallel with the item on the touch panel 170. Meanwhile, when the touched point is moved, the selected item is changed. That is, when the touched point is moved, an item arranged parallel with the touched point is selected.

The terminal notifies the user of the selection of the item, using a light emitting device indicating the selected item among the plurality of light emitting devices included in the light emitting device unit 160 (S320). For example, the step 320 is implemented by repeatedly turning on/off at least one light emitting device located at a position arranged parallel with the selected item among the plurality of light emitting devices included in the light emitting device unit 160.

The terminal performs a function allocated to the selected item (S330). The function may include the movement from a higher-level menu item to a lower-level menu item, the execution of a menu item, the execution of a file (for example, the drive of an audio file or a video file) and the switch of a broadcast channel. In the step S330, the function allocated to the selected item is performed by releasing the touch of any point of the touch panel 170.

Figure 4:
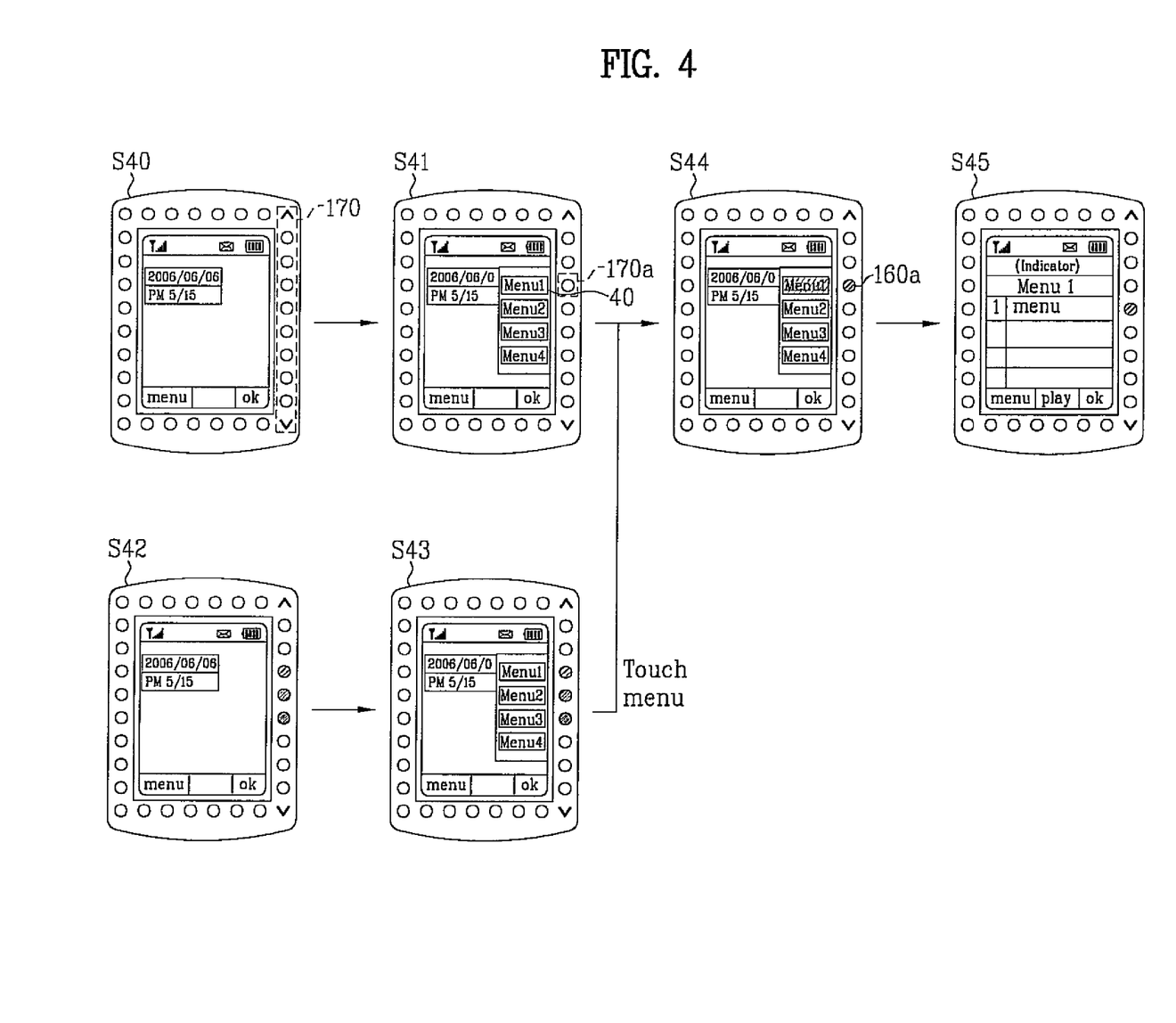
FIG. 4 is a view showing an example of applying the method of notifying the selection of the item according to an embodiment of the present invention to an access to a menu.

FIG. 4 is a view showing an example of applying the method of notifying the selection of the item according to an embodiment of the present invention to an access to a menu. When the user touches any point of the touch panel 170 (S40), at least one menu item is displayed on the display unit 150 (S41). When the user touches a point 170a of the touch panel 170 arranged parallel with "Menu 1" 40 (S41), the shadow of the "Menu 1" 40 displayed on the display unit 150 is inverted and at least one light emitting device 160a arranged parallel with the "Menu 1" 40 is turned on (S44). In a state S44, the user can know that the "Menu 1" is selected by turning on at least one light emitting device 160a. When the point 170a of the touch panel is touched again, the screen moves to a sub-menu allocated to the "Menu 1" 40.

Meanwhile, in the states S42 and S43 of FIG. 4, only at least one light emitting device arranged parallel with the menu selected by the same process as that described above may be turned on in a state that the colors of the light emitting devices are different from one another according to the amount of information allocated to the menus ("Menu 1" to "Menu 4" in FIG. 4).

Figure 5:
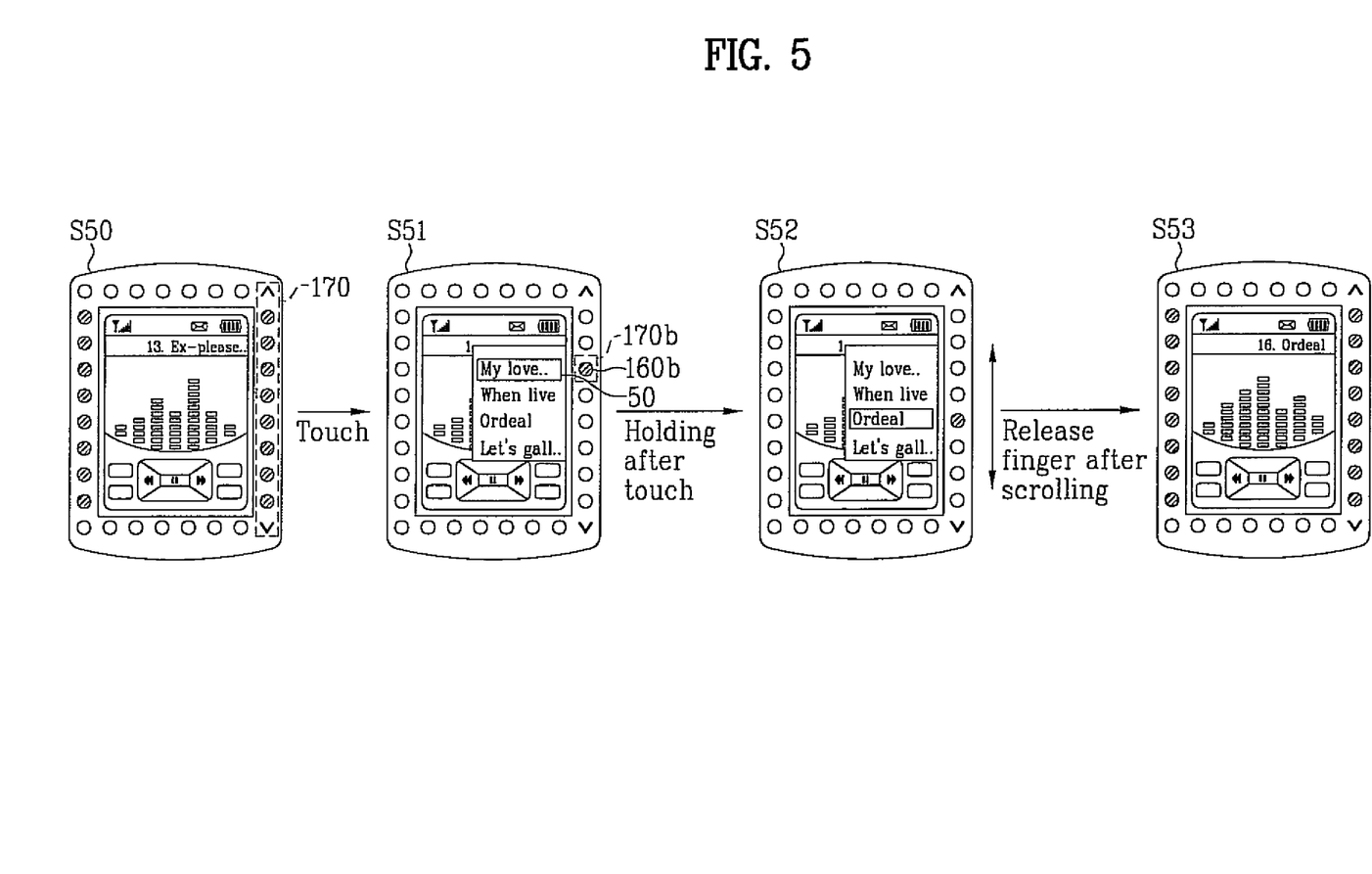
FIG. 5 is a view showing an example of applying the method of notifying the selection of the item according to an embodiment of the present invention to an MP3 function.

FIG. 5 is a view showing an example of applying the method of notifying the selection of the item according to an embodiment of the present invention to an MP3 function. When the user touches any point of the touch panel 170 during executing the MP3 function provided by the terminal shown in FIGS. 1 and 2 (S50), at least one MP3 file is displayed on the display unit 150 (S51). When the user touches a point 170b of the touch panel 170 arranged parallel with an MP3 file "My love, you . . . " 50, the shadow of the "My love, you . . . " 50 displayed on the display unit 150 is inverted and at least one light emitting device 160b arranged parallel with the "My love, you . . . " 50 is turned on (S51). When the touched point of the touch panel 170 is moved, an MP3 file arranged parallel with the moved point is selected and the light emitting device located at the moved point is turned on (S52). When the touch of the point is released, the selected MP3 file is driven (S53).

Figure 6:
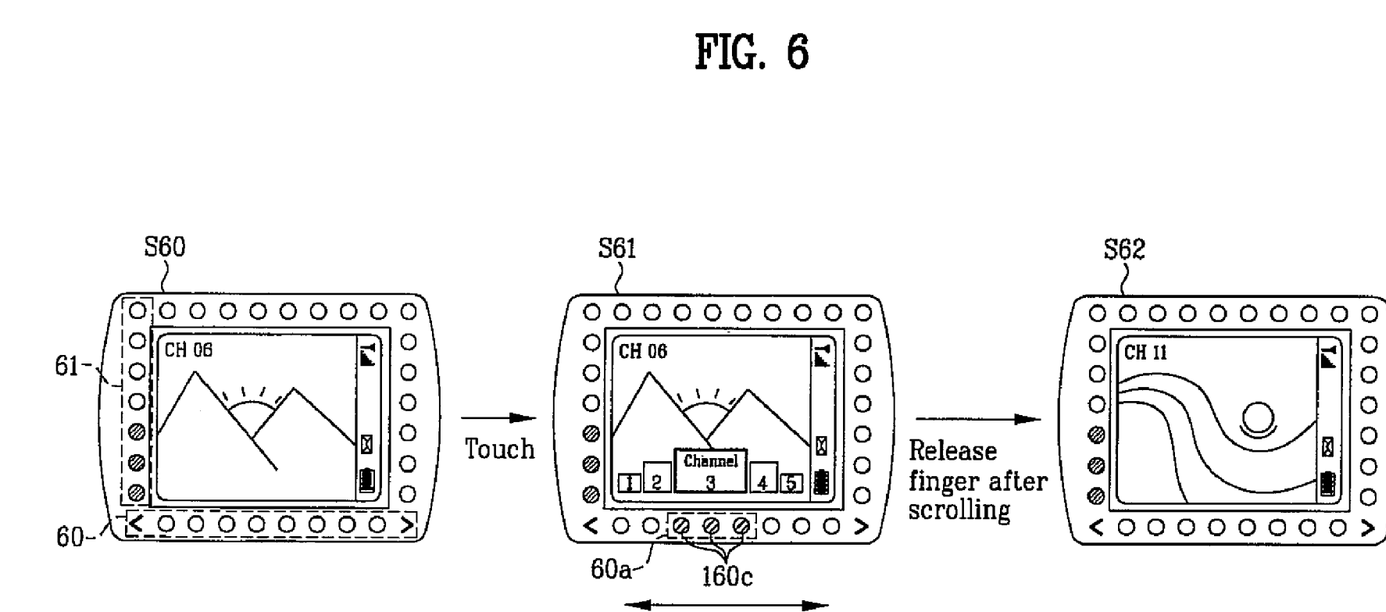
FIG. 6 is a view showing an example of applying the method of notifying the selection of the item according to an embodiment of the present invention to a broadcast viewing function.

FIG. 6 is a view showing an example of applying the method of notifying the selection of the item according to an embodiment of the present invention to a broadcast viewing function. FIG. 6 shows the touch panel 170 including a first region 60 and a second region 61 having different functions. For example, a function for selecting a broadcast channel is allocated to the first region 60 and a function for adjusting a volume is allocated to the second region 61.

When the user touches any point of the first region 60 of the touch panel 170 during in the broadcast viewing function provided by the terminal shown in FIGS. 1 and 2 (S60), at least one broadcast channel is displayed on the display unit 150 (S61). The user touches a point 60a of the first region 60 arranged parallel with any one of at least one broadcast channel displayed on the display unit 150 to choose the broadcast channel (S61). When the point 60a of the first region 60 is touched, a light emitting device 160c located at the point 60a is turned on (S61). When the touched point of the first region 60 is moved, a broadcast channel arranged parallel with the moved point is chosen and a light emitting device located at the moved point is turned on. When the touch of the first region 60 is released, a broadcast program received through the chosen broadcast channel is displayed on the display unit 150 (S62).

Figure 7:
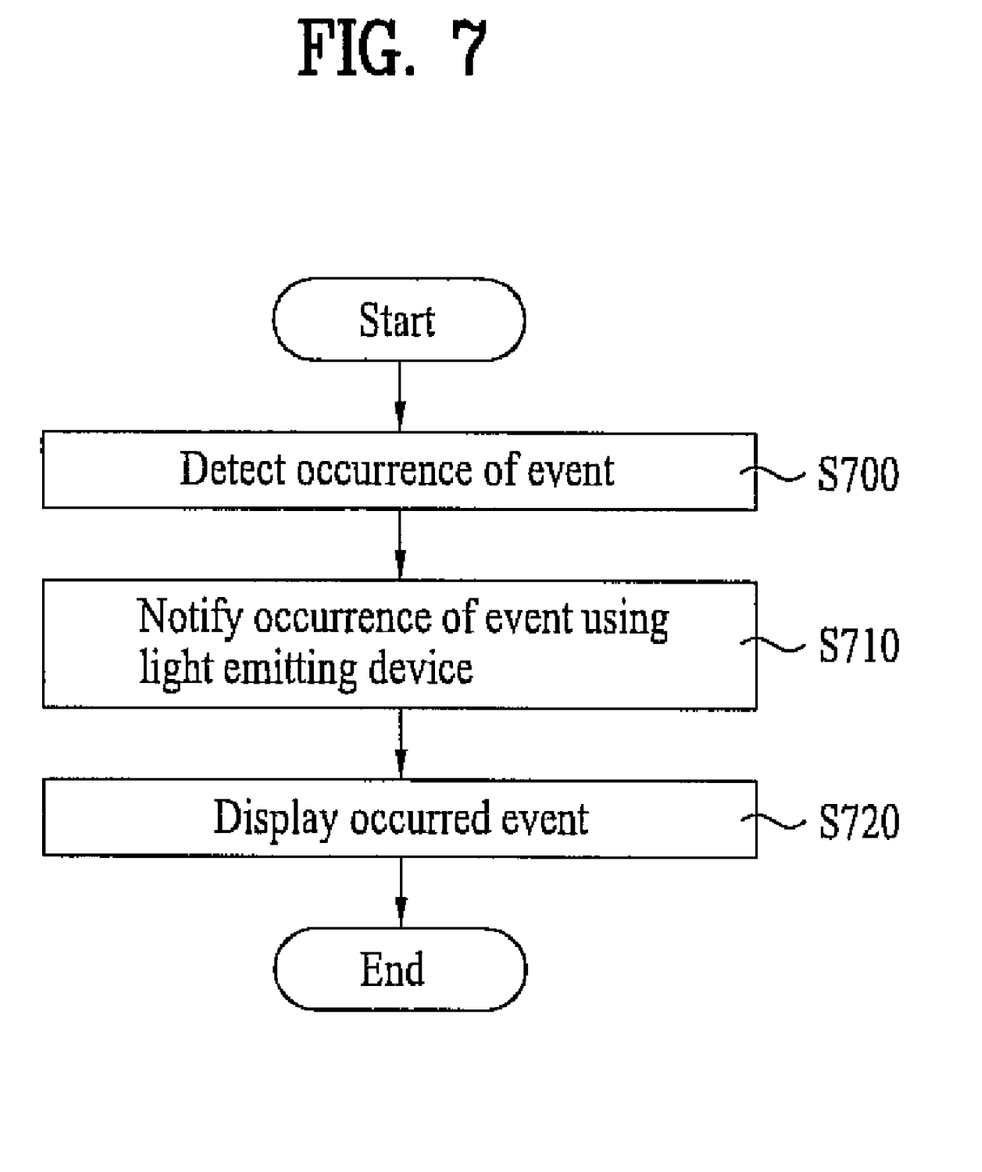
FIG. 7 is a flowchart illustrating a method of notifying the occurrence of an event using the light emitting device in the terminal according to an embodiment of the present invention.

Hereinafter, a method of notifying the occurrence of an event using the terminal, according to an embodiment of the present invention shown in FIGS. 1 and 2, will be described in detail, concentrating on the operation of the control unit 130. FIG. 7 is a flowchart illustrating a method of notifying the occurrence of an event using the light emitting device in the terminal according to an embodiment of the present invention.

First, the control unit 130 detects the occurrence of an event (S700). The event is related to a function which can be provided by the terminal, such as the state change of the terminal which can be detected by the terminal, the transmission/reception of data and the input/output of data. That is, the event indicates the activation or execution of any one of at least one function provided by the terminal. The event may include the movement between items (for example, a menu item or file), the transmission/reception of a text message or a call through the mobile communication module 100, an alarm function and so on.

The control unit 130 notifies the user of the occurrence of the event using at least one light emitting device allocated to the occurred event among the light emitting devices included in the light emitting device unit 160 according to the detection of the occurrence of the event (S710). The step S710 is implemented by allowing the control unit 130 to repeatedly turn on/off at least one light emitting device allocated to the occurred event.

When the occurred event is in progress, the control unit 130 can sequentially turn on the plurality of light emitting devices allocated to the occurred event. For example, when the text message is currently being transmitted, the control unit 130 can sequentially turn on at least one light emitting device allocated to the transmission of a text message so as to notify the user that the text message is currently being transmitted.

The control unit 130 outputs a control signal for displaying the occurred event on the display unit 150 according to the detection of the occurrence of the event. The display unit 150 displays the occurred event according to the control signal (S720). For example, when a text message is received, information on the reception of the text message or the received text message is displayed on the display unit 150.

Figure 8:
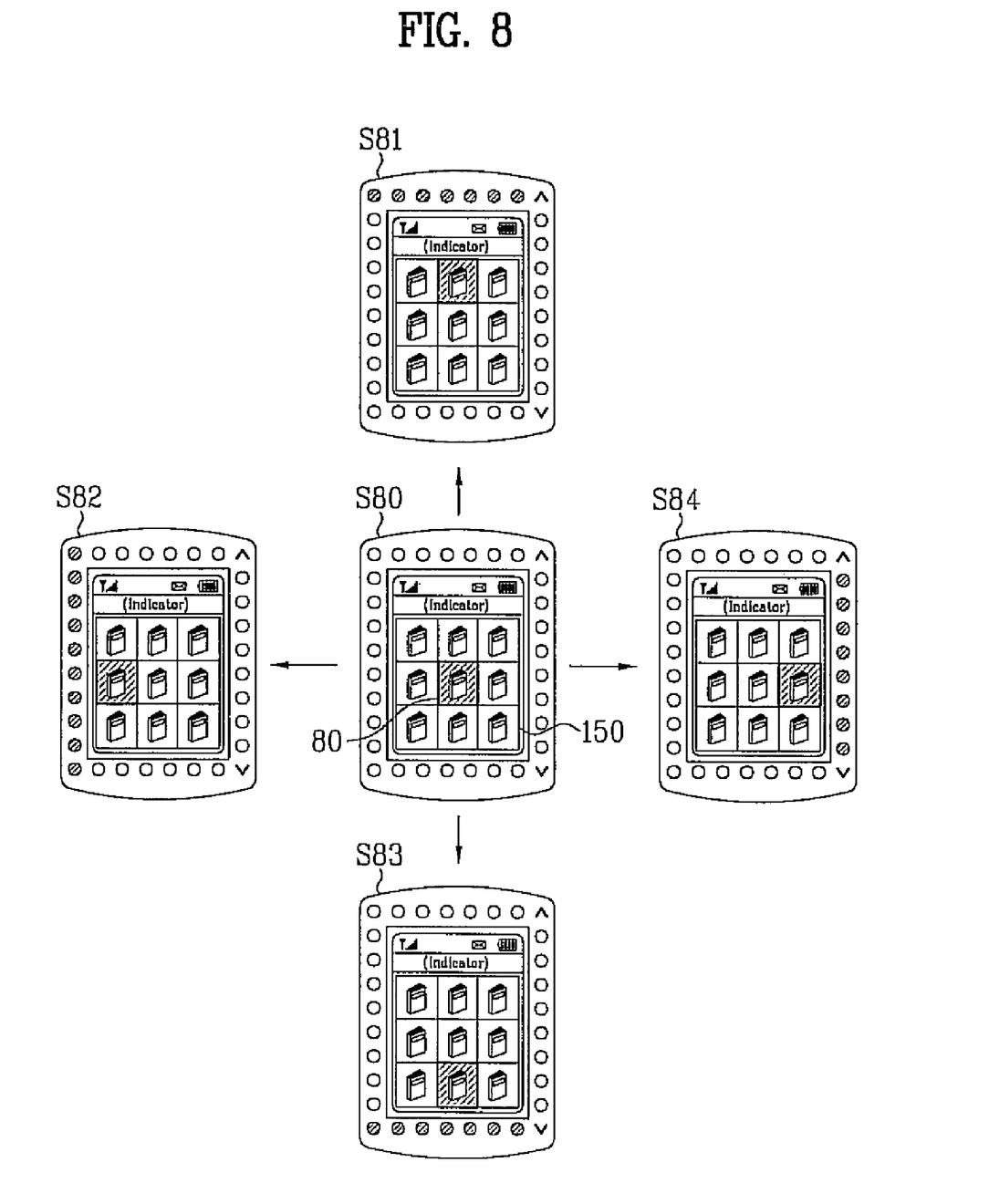
FIG. 8 is a view showing an example of applying the method of notifying the occurrence of the event according to an embodiment of the present invention to the movement between items included in a menu.

FIG. 8 is a view showing an example of applying the method of notifying the occurrence of the event according to an embodiment of the present invention to the movement between items included in a menu. FIG. 8 shows a menu including nine items. In a state S80 that a choice indicator 80 indicating that an item is chosen is located at the center of the nine items, the user may move the choice indicator 80 to any one of eight remaining items using the directional keys included in the key input unit 120. For example, when the user presses a directional key indicating an upper direction in the state S80, the choice indicator 80 moves by one block in an upper direction. In order to be notified of the upward movement of the choice indicator 80, the plurality of light emitting devices located at the upper side of the display unit 150 is turned on (S81). Similarly, when the choice indicator 80 moves by one block in a left, lower or right direction, at least one light emitting device allocated to each direction is turned on (S82, S83, and S84).

Figure 9:
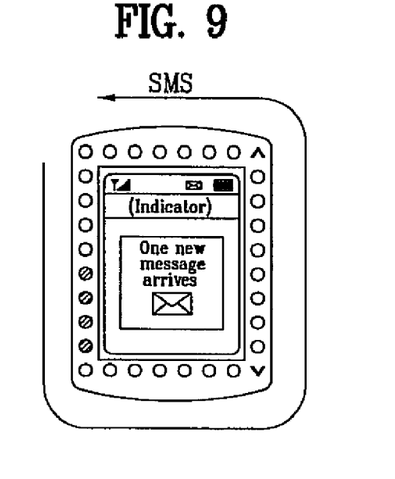
FIG. 9 is a view showing an example of applying the method of notifying the occurrence of the event according to an embodiment of the present invention to the reception of a text message.

FIG. 9 is a view showing an example of applying the method of notifying the occurrence of the event according to an embodiment of the present invention to the reception of a text message. For example, when an event that the terminal receives a text message through the mobile communication module 100 occurs, the control unit 130 controls the light emitting device unit 160 to turn on/off the light emitting devices included in the light emitting device unit 160 in order (in a direction denoted by an arrow shown in FIG. 9).

Figure 10:
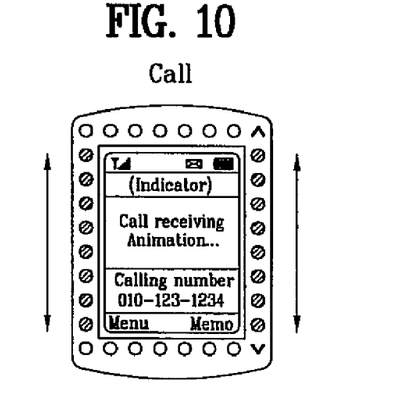
FIG. 10 is a view showing an example of applying the method of notifying the occurrence of the event according to an embodiment of the present invention to the reception of a call.

FIG. 10 is a view showing an example of applying the method of notifying the occurrence of the event according to an embodiment of the present invention to the reception of a call. For example, when an event that the terminal receives a call through the mobile communication module 100 occurs, the control unit 130 controls the light emitting device unit 160 to turn on/off the light emitting devices located at the left and right sides of the display unit 150 included in the light emitting device unit 160 in order (in a direction denoted by an arrow shown in FIG. 10).

Figure 11:
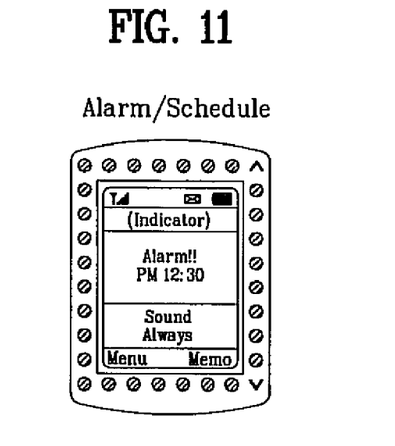
FIG. 11 is a view showing an example of applying the method of notifying the occurrence of the event according to an embodiment of the present invention to an alarm function.

FIG. 11 is a view showing an example of applying the method of notifying the occurrence of the event according to an embodiment of the present invention to an alarm function. In general, an alarm sound is generated or an alarm indication is displayed at a predetermined time by the alarm function provided by the terminal. According to the present invention, the alarm may be given by turning on/off at least one light emitting device included in the light emitting device unit 160, instead of the alarm sound or display. For example, as shown in FIG. 11, the alarm may be given by turning on/off at least one light emitting device included in the light emitting device unit 160 in a predetermined period.

Figure 12:
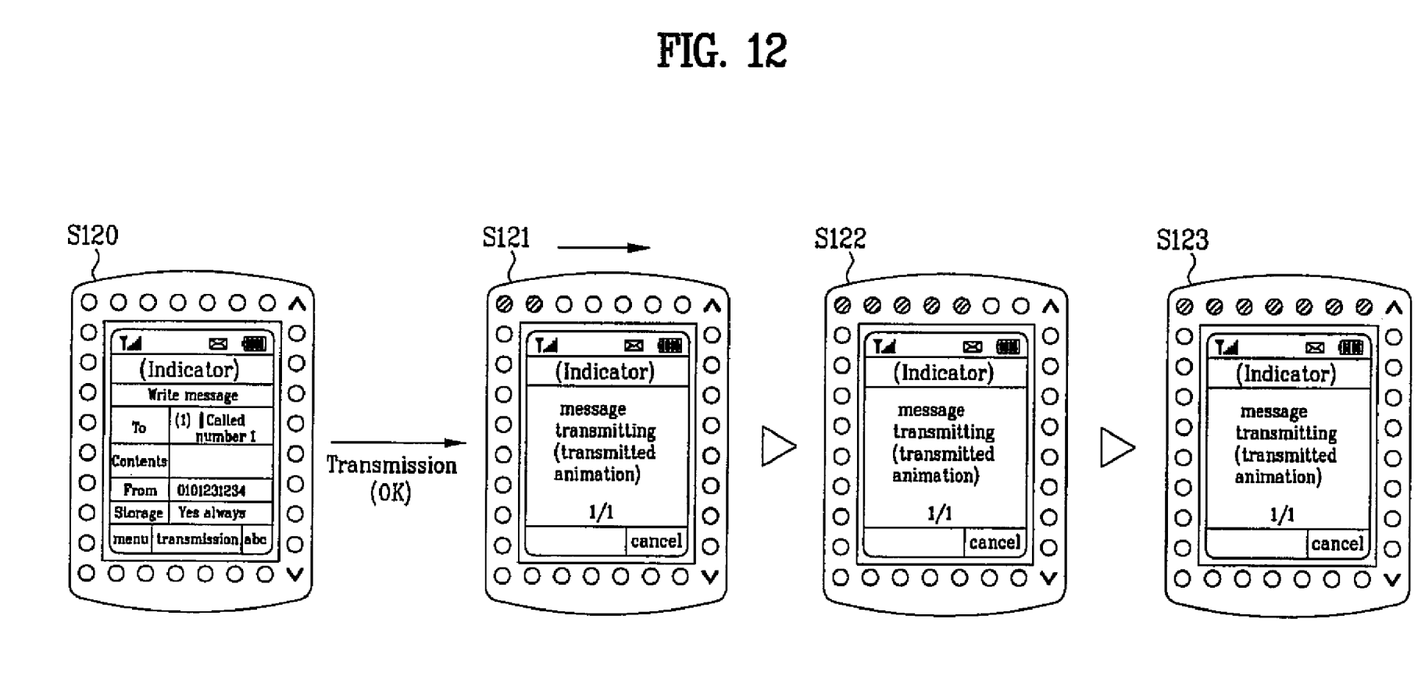
FIG. 12 is a view showing an example of applying the method of notifying the occurrence of the event according to an embodiment of the present invention to the transmission of a text message.

FIG. 12 is a view showing an example of applying the method of notifying the occurrence of the event according to an embodiment of the present invention to the transmission of a text message. The event is related to the state of activating a function provided by the terminal and executing the activated function. For example, when a text message is transmitted, the progress degree of the transmission of the text message is provided through the light emitting device unit 160. That is, as shown in FIG. 12, the user writes a message and presses a transmission button (S120). Thereafter, a message "message transmitting" is displayed on the display unit 150 and the plurality of light emitting devices located at the upper side of the display unit 150 is sequentially turned on according to the progress degree of the transmission of the message (S121, S122, and S123). The user can know the progress degree of the transmission through the number of light emitting devices turned on among the plurality of light emitting devices located at the upper side of the display unit 150. Meanwhile, the user may be notified of the progress degree of the transmission of the message through the light emitting device unit 160 while performing another function unrelated to the transmission of the message. That is, a terminal for supporting multi-tasking can notify the progress degree of a second function (for example, the transmission of a text message) through the light emitting device unit 160 while displaying a screen related to a first function (for example, picture viewing) on the display unit 150.

The example of FIG. 12 may apply to the notification of the progress state of a function provided by the terminal, such as the transmission/reception of data other than the text message, the deletion of a file, or the loading of a file, using the light emitting device unit 160. That is, in order to be notified of the progress degree of the execution of a function which is time consuming, while a progress bar is displayed on the display unit 150 in a conventional technology, the light emitting device unit 160 is used as the progress bar in the present invention.

Figure 13:
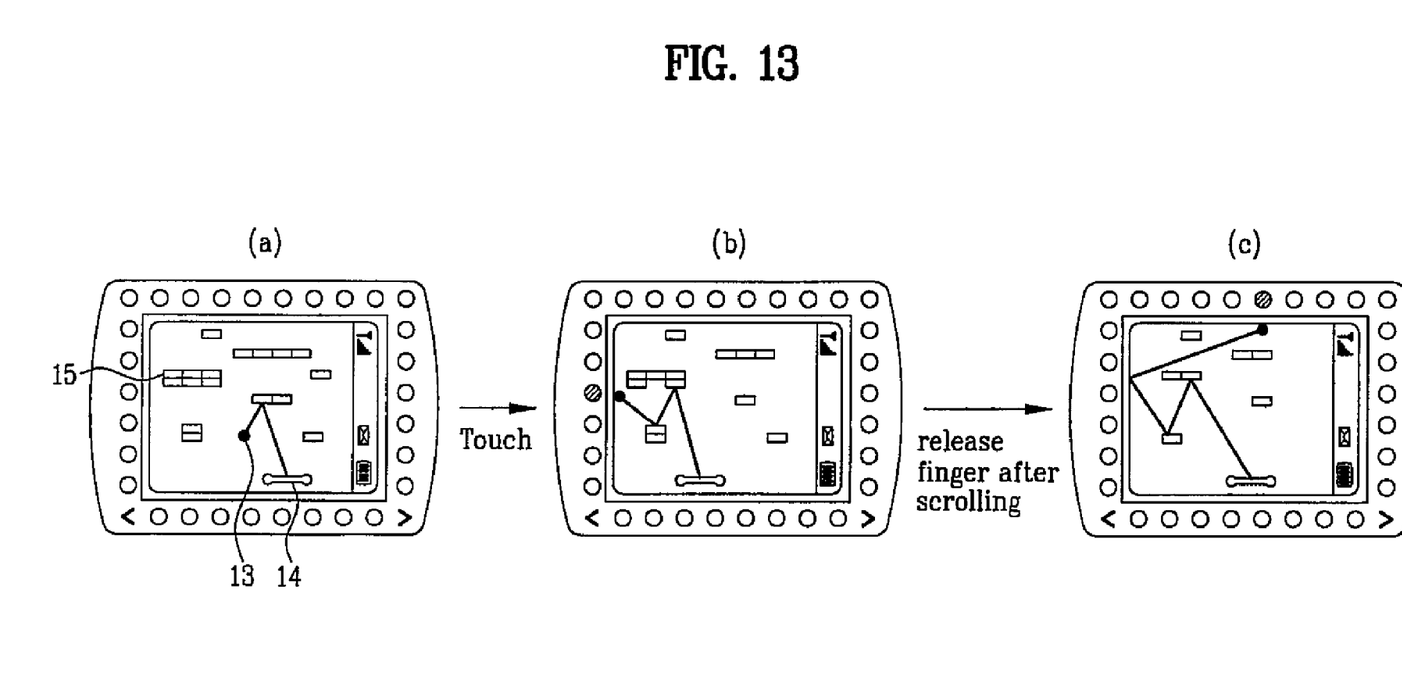
FIG. 13 is a view showing an example of applying the method of notifying the occurrence of the event according to an embodiment of the present invention to a game function.

FIG. 13 is a view showing an example of applying the method of notifying the occurrence of the event according to an embodiment of the present invention to a game function. In FIG. 13, a game for reflecting a ball 13 from a rod 14 to break a block 15 is shown. The rod 14 horizontally moves using the directional keys included in the key input unit 120. When the ball 13 bumps against the rod 14 or the block 15 and bumps against the wall of the display unit 150, the light emitting device arranged parallel with the bumped point is turned on. FIGS. 13b and 13c show an example of turning on the light emitting device arranged parallel with the bumped point when the ball 13 bumps against the wall of the display unit 150.

Figure 14:
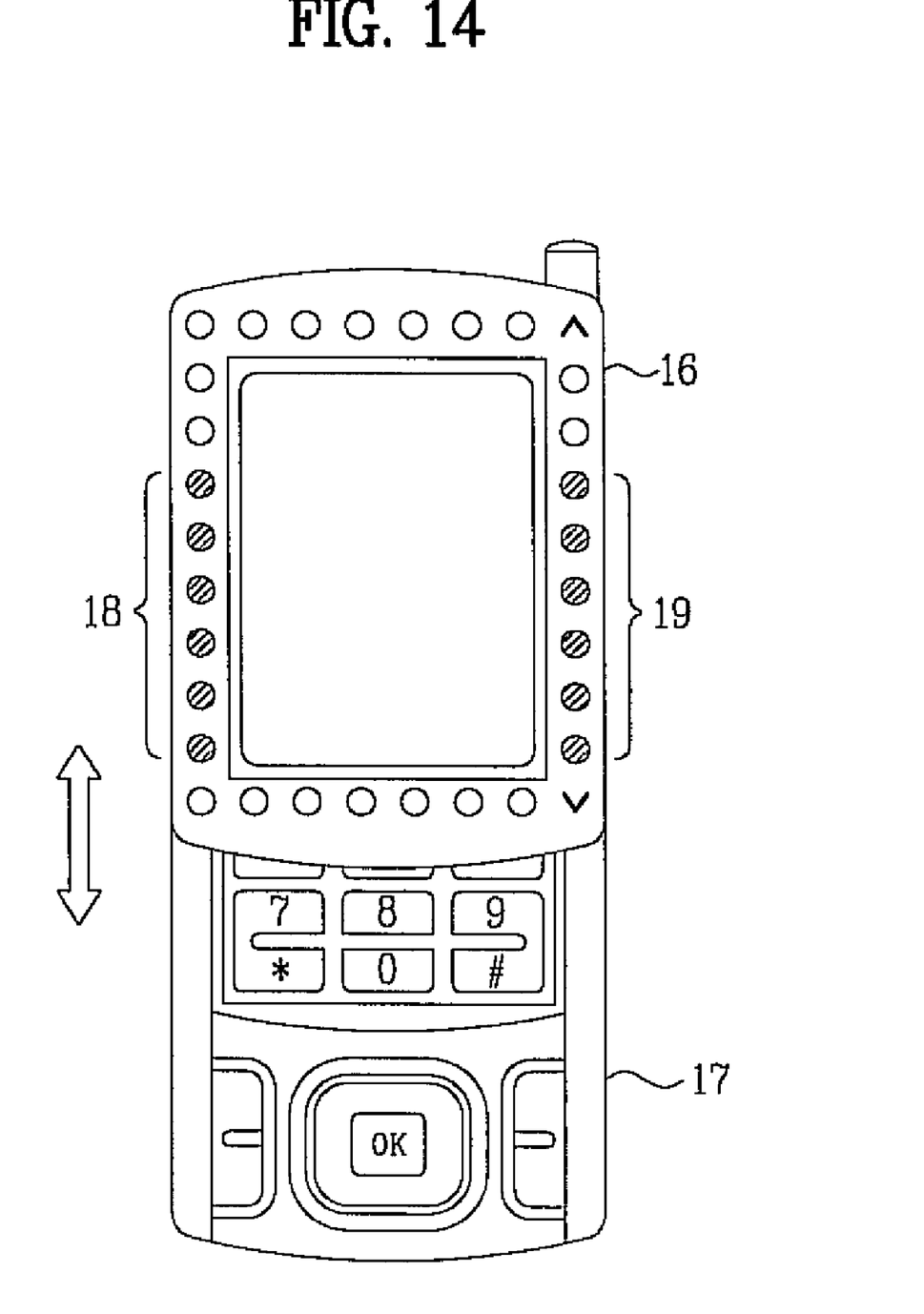
FIG. 14 is a view showing an example of applying the method of notifying the occurrence of the event according to an embodiment of the present invention to the sliding open of a slide phone.

FIG. 14 is a view showing an example of applying the method of notifying the occurrence of the event according to an embodiment of the present invention to the sliding open of a slide phone. If the terminal is a slide phone including an upper body 16 and a lower body 17, the opening degree of the upper body 16 may be represented using the light emitting device unit 160. For example, when the upper body 16 moves by 50% of the total movement distance of the upper body 16, the light emitting devices 18 and 19 corresponding to half of the plurality of light emitting devices included in the light emitting device unit 160 are turned on as shown in FIG. 14.

As described above, the effects of a terminal including a light emitting device, a method of notifying the selection of an item using the terminal, and a method of notifying the occurrence of an event using the terminal according to the present invention are as follows:

First, since a user can be notified of the selection of an item such as a menu item or file using the light emitting device included in the terminal, it is possible to increase the recognizability of the selection of the item of the user and to provide new interest and convenience to the user.

Second, since the user can be notified of the occurrence of an event related to a function provided by the terminal, such as the movement between items included in a menu, the transmission/reception of a message, the transmission/reception of a call, an alarm function, and a game function, using the light emitting device included in the terminal, it is possible to increase the recognizability of the occurrence of the event of the user and to provide new interest and convenience to the user.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of notifying the occurrence of an event using a plurality of light emitting devices provided in a terminal, the method comprising:
   detecting the occurrence of a first event and a second event;
   displaying, on a display unit included in the terminal, a screen related to execution of the first event according to the detection of the occurrence of the first event;
   activating at least one light emitting device allocated to the second event among the plurality of light emitting devices in order to notify the occurrence of the second event according to the detection of the occurrence of the second event; and
   activating two or more of the plurality of light emitting devices allocated to the second event, a number of the plurality of light emitting devices activated corresponding to a degree of progress of the second event,
   wherein the plurality of light emitting devices are provided at a peripheral region surrounding the display unit, and
   wherein the second event includes a movement between items, a transmission/reception of a message or a call, or an alarm function.

2. The method of claim 1, wherein activating the at lease one light emitting device comprises repeatedly turning on/off the at least one light emitting device.

3. The method of claim 1, wherein activating the two or more of the plurality of light emitting devices comprises sequentially turning on the two or more of the plurality of light emitting devices when the second event is in progress.

4. A terminal comprising:
- a display unit configured to display information;
- a plurality of light emitting devices provided at a peripheral region surrounding the display unit;
- a touch panel provided at the same peripheral region as the plurality of light emitting devices; and
- a control unit configured to detect an occurrence of a first event and a second event, control the display unit to display a screed related to execution of the first event according to the detection of the occurrence of the first event, activate at least one light emitting device allocated to the second event among the plurality of light emitting devices in order to notify the occurrence of the second event and activate two or more of the plurality of light emitting devices allocated to the second event, a number of the plurality of light emitting devices activated corresponding to a degree of progress of the second event,
- wherein the second event includes at least a movement between items, a transmission/reception of a message or a call, or an alarm function.

5. The terminal of claim 4, wherein the control unit is further configured to control the at least one light emitting device to be repeatedly turned on/off.

6. The terminal of claim 4, wherein the control unit is further configured to control the two or more of the plurality of light emitting devices to be sequentially turned on when the second event is in progress.

7. The terminal of claim 4, wherein the plurality of light emitting devices are light emitting diodes.

8. A terminal comprising:
- a display unit configured to display information;
- a plurality of light emitting devices provided at a peripheral region surrounding the display unit; and
- a control unit configured to execute a first function and a second function, control the display unit to display a screen related to the execution of the first function and activate two or more of the plurality of light emitting devices, a number of the plurality of light emitting devices activated corresponding to a degree of progress of the execution of the second function in order to notify the degree of progress of the execution of the second function,
- wherein the second function includes a transmission/reception of data, a deletion of data, a loading of data or a degree of opening of a slide-type terminal.

9. The terminal of claim 8, further comprising:
- an input unit configured to receive a touch drag action in a first direction,
- wherein the control unit is further configured to activate the two or more of the plurality of light emitting devices sequentially in the first direction according to the touch drag action.

* * * * *